Patented Sept. 11, 1934

1,972,876

UNITED STATES PATENT OFFICE 1,972,876

METHOD OF EXTRACTING CARDIO-ACTIVE PRINCIPLES OF SQUILL

Clair Sedgwick Dyas, Glen Ellyn, Ill., assignor to The Grisard Laboratories, Inc., Winchester, Tenn., a corporation of Tennessee No Drawing. Application September 22, 1930, Serial No. 483,745

23 Claims. (Cl. 87—28)

The invention relates to the extraction, separation and purification of the cardio-active principles of squill (Bulbus Scilla maritima (L) Baker, or other species of squill containing cardio-active substances). It has been previously supposed that but one cardio-active principle was contained in squill, and former processes have been directed to the extraction from squill of a glucoside containing such cardio-active principle. I have found, on the other hand, that squill contains at least three separate and distinct cardio-active principles, having different properties, and these principles I have succeeded in extracting from squill and separating from each other by the processes herein set forth. For the purpose of distinguishing the cardio-active principles from each other, there may be conveniently designated as cardio-active Principles I, II and III, the properties of which will be more fully set forth hereinafter.

For the purpose of illustration, I will set forth at length the steps by which the extraction and separation of the cardio-active principles of squill may be most efficiently carried out, although it will be obvious that many features of the herein described method may be varied without departing from the spirit of the invention.

Squill is first completely dehydrated and then ground and percolated with an organic solvent miscible with water, such as ethyl alcohol, methyl alcohol or the like. The drug is then placed in percolators and thoroughly exhausted with this solvent. The percolate is then distilled, preferably in vacuo, to recover the solvent. The extract resulting from this percolate contains all three of the cardio-active principles of squill, together with certain undesirable substances including scillin (an emetic principle). The scillin, together with the oil, fats and impurities, may then be removed in the following manner.

The extract resulting from the distillation of the drug percolate is mixed with water and is then treated with an organic solvent not miscible with water, petroleum ether or gasoline being suitable for this purpose. The materials are thoroughly agitated and then allowed to settle. The immiscible solvent, carrying with it most of the scillin and oils and fats, separates into a distinct layer from the aqueous solution. This solvent, carrying with it the contained impurities, is then removed and the aqueous solution is filtered. In the filtering operation a water insoluble residue will remain on the filter paper. This residue and the aqueous filtrate both contain the cardio-active principles and both are further treated for the extraction and separation of such substances. The water insoluble residue, however, still contains impurities which it is necessary to separate out before carrying out the further steps of the process. This is accomplished as follows.

The water insoluble matter is first dissolved in a dilute alcoholic solvent. This solution is then agitated with an organic solvent not miscible with water, such as petroleum ether or gasoline, whereby substantially complete extraction of the oils, fats and scillin is effected. The alcohol from this diluted solvent is recovered in vacuo, after removal of the immiscible solvent, and the aqueous solution remaining is then treated with an alkaline carbonate or hydroxide, such as sodium carbonate, potassium carbonate or calcium hydroxide, to effect solution of the precipitate resulting from the removal of the alcohol.

The resulting aqueous solution is now treated with a precipitating agent, such as tannic acid, and the solution neutralized with an organic acid, such as acetic acid, citric acid, or tartaric acid, which causes the precipitation of the cardio-active principles in the form of tannates. The remaining solution is then super-saturated by the addition of an inorganic salt, such as sodium chloride, magnesium sulphate, sodium sulphate or the like, for the purpose of more completely precipitating the tannates of the cardio-active principles. The precipitated tannates are now separated from the solution to be combined later with tannates obtained from the first aqueous filtrate in the manner now to be described.

This filtrate is treated with a suitable organic precipitating agent, such as tannic acid, which causes the partial precipitation of the tannates and the complete precipitation is effected by the addition of an inorganic salt, such as sodium chloride, magnesium sulphate, sodium sulphate or the like. These tannates of the cardio-active principles are separated from the aqueous solution and are combined with the tannates produced from the separate treatment of the insoluble residue as previously described.

The combined tannates of the cardio-active principles are now carefully washed with water to remove any inorganic salts carried down with the precipitate in the step just described. These tannates of the cardio-active principles are now thoroughly mixed with an inorganic oxide or hydroxide, such as zinc oxide, lead oxide, calcium oxide, or the hydroxides of calcium, lead, iron and the like, the purpose being to liberate the cardio-active principles from their organic precipitant.

The mixture is then dried in vacuo and exhausted by the aid of heat, an organic solvent miscible in water, such as ethyl alcohol, methyl alcohol or the like, being added. The solvent is recovered in vacuo and the cardio-active principles remaining in the still are mixed with water.

By the steps of the process so far described the cardio-active principles are extracted from the squill, purified and prepared for the separation of the individual cardio-active principles, one from another. This individual separation is carried on as follows.

The mixture obtained as described above and containing the three purified cardio-active principles in the form of glucosides derived from the squill is agitated with an organic solvent not miscible with water, such as absolute ethyl acetate. The ethyl acetate separates two of the cardio-active principles from the third, which latter remains in the aqueous solution within the still. The immiscible solvent containing Principles I and II in solution is separated from the aqueous layer and the solvent is recovered in vacuo, the cardio-active Principles I and II remaining in the still. These are now treated with a solvent, such as chloroform, the solution being obtained with the aid of heat. The chloroform carries into solution both of the cardio-active Principles I and II.

To effect separation of cardio-active Principle I from Principle II, the solution containing these principles is agitated with a very dilute aqueous solution of an alkaline carbonate or hydroxide, such as sodium carbonate, calcium hydroxide or the like. The solvent is recovered in vacuo, leaving as a residue Principle I. This cardio-active principle is now dissolved by the aid of heat in a solvent, such as absolute ethyl acetate, from which the cardio-active principle may be crystallized by concentration and may be completely purified by recrystallization from such solvents as acetone, ethyl or methyl alcohol, chloroform or the like.

To obtain the cardio-active Principle II, the alkaline carbonate or hydroxide solution containing this principle is neutralized with an organic acid, such as acetic acid, citric acid, tartaric acid or the like, and Principle II is removed by the use of an organic solvent not miscible with water, such as absolute ethyl acetate. The solvent may be recovered in vacuo leaving Principle II in a highly purified condition.

Principle III is obtained from the aqueous solution remaining after the removal of Principles I and II from the aqueous mixture after the first treatment with ethyl acetate. The remaining solution containing this cardio-active principle is treated with an organic precipitating agent, such as tannic acid, and complete precipitation is effected by the addition of an inorganic salt, such as sodium chloride, magnesium sulphate, sodium sulphate or the like. This cardio-active Principle III in the form of a tannate may then be treated with an inorganic oxide or hydroxide, such as zinc oxide, lead oxide, calcium oxide, or the hydroxides of lead, iron and the like, to liberate the cardio-active principle from the organic precipitant. The mixture is then thoroughly dried in vacuo and exhausted by the aid of heat with a dehydrated organic solvent, such as absolute ethyl alcohol. The solvent may be recovered in vacuo, leaving cardio-active Principle III in a highly purified condition.

The process as outlined above may be more fully illustrated by a specific example setting forth actual operating conditions.

*Example*

1600 pounds of selected white sliced squill are thoroughly dehydrated in vacuo or at a low temperature, then ground and percolated with specially denatured alcohol, U. S. Formula No. 1, until 5 pints of percolate are obtained for every pound of squill treated. The residue is then placed in percolators and extracted by repercolation with this solvent until completely exhausted. The percolate is distilled in vacuo to recover the solvent.

The combined extract remaining in the still as a result of this distillation is now mixed with 30 gallons of water at a temperature not exceeding 60° C. The mixture is thoroughly stirred until all the extractive is disintegrated. The mixture is then allowed to cool and, when cooled, is transferred to a tank suitable for agitation. To this mixture 10 gallons of petroleum ether are added and the whole thoroughly agitated for 1 hour.

The petroleum ether containing the scillin, oils and fats is removed and another 5 gallons of petroleum ether added, stirred for an hour and removed. The aqueous solution is now filtered, leaving an insoluble residue upon the filter. To the insoluble residue 10 gallons of 47% specially denatured alcohol, U. S. Formula No. 1, is added and the mixture heated at 60° C. until the residue is dissolved. The solution is then filtered to remove any remaining insoluble impurities, and the alcoholic portion of the solvent is recovered in vacuo. The remaining aqueous solution is brought to a volume of 5 gallons by the addition of sufficient water, and 2 ounces of sodium carbonate are added to effect resolution of the precipitated material.

12 ounces of tannic acid in very concentrated aqueous solution are now added to the above alkaline solution, and the resulting solution is neutralized with No. 8 acetic acid, which results in the partial precipitation of tannates containing the cardio-active principles. These tannates are now separated from the solution, and 10 pounds of sodium chloride added to the solution to effect complete precipitation of further tannates. This precipitate is separated from the solution and combined with the former tannates.

To the aqueous filtrate 20 ounces of tannic acid in concentrated aqueous solution is added and the resulting precipitate removed. 60 pounds of sodium chloride is then added to the aqueous solution to effect complete precipitation of further tannates.

The tannates resulting from the treatment of the insoluble residue are combined with the tannates thus obtained from the aqueous filtrate, and the whole thoroughly washed with water to remove any sodium chloride adhering to the precipitate. Zinc oxide to the amount of 50% by weight of the dried tannates is now added and thoroughly incorporated and the mixture dried in vacuo. This mixture is then exhausted by extraction with the aid of heat at a temperature not exceeding 60° C. with the addition of three portions of denatured alcohol, U. S. Formula No. 1, the portions being respectively of 10, 5 and 5 gallons each. The combined alcoholic solutions are filtered and the alcohol recovered in vacuo.

3 gallons of distilled water and 2 gallons of absolute ethyl acetate are then added to the material remaining in the still and the whole agitated for an hour. The ethyl acetate is then siphoned off and the washing repeated with two further portions of 2 gallons each of ethyl acetate or until by test the aqueous solution is shown to be exhausted.

The absolute ethyl acetate washings are combined and recovered in vacuo, the residue representing cardio-active Principles I and II, which are now dissolved with the aid of heat in 3 gallons of U. S. P. chloroform and the chloroform solution successively treated with three portions of 12 pints, 8 pints and 4 pints respectively of ½% sodium carbonate aqueous solution. The chloroform solution is decolorized with carbon, clarified by filtration and recovered in vacuo, leaving as a residue all of cardio-active Principle I, Principle II having been removed by the sodium carbonate solution. Principle I is obtained in pure crystalline condition by solution and concentration in absolute ethyl alcohol, acetone or the like.

The dilute alkaline solution containing Principle II is neutralized with acetic acid and agitated with successive portions of 12 pints, 8 pints and 4 pints respectively of absolute ethyl acetate or until by test the aqueous solution is shown to be exhausted, leaving Principle II, after the recovery in vacuo of the combined ethyl acetate washings, in a high state of purity.

The aqueous solution from which cardio-active Principles I and II have been removed is now treated with a concentrated solution of tannic acid to effect complete precipitation of the remaining cardio-active principle as a tannate. The tannate is recovered, washed with water and treated with zinc oxide in the same manner and the same proportions as the previous tannates were treated. The material is then dried in vacuo and exhausted with absolute ethyl alcohol. On recovery of the absolute alcohol in vacuo, Principle III remains in a high state of purity.

A preferred embodiment of the process has been described in detail for the purpose of illustration. It will be obvious, however, that many of the features of the process as described may be varied without departing from the spirit or principles of the invention. Some of the steps of the process are desirable from the standpoint of most complete efficiency, but may be omitted if desired, and the final purified products still obtained. Thus the repeated washing of residues containing small quantities of the cardio-active principles is a desirable but not essential step.

My process may be considered as consisting of two important stages, first, the separation of the three cardio-active principles from undesirable or inactive matter, and second, the separation of the individual cardio-active principles from each other. The first stage of my process I regard as an improvement over any previously known process designed for this purpose, and the second stage of my process I regard as broadly novel. The details of both stages may be varied without departing from the essentials of the invention.

An alternative process for the extracting, separating and purification of the cardio-active principles of squill will now be described.

Squill is first preliminarily treated in the same manner as described in the preferred embodiment of the invention, being ground, macerated, and percolated with an organic solvent, such as ethyl alcohol, the percolate is distilled in vacuo, the extractive mixed with water and the oil, scillin and fat removed by agitation with an organic immiscible solvent such as petroleum ether or gasoline.

After complete separation of the immiscible solvent, the aqueous solution is directly agitated with an immiscible organic solvent, such as amyl alcohol or butyl alcohol. The immiscible solvent, which now contains all the cardio-active principles, is separated from the aqueous solution and recovered by distilling in vacuo. The resulting cardio-active principles remaining in the still are dissolved in a very dilute aqueous solution of an alkaline carbonate or hydroxide, such as sodium carbonate, potassium carbonate, calcium hydroxide or the like. This solution is now treated with an organic precipitating agent, such as tannic acid, and neutralized with an organic acid, such as acetic acid, citric acid or tartaric acid, effecting partial precipitation of all the cardio-active principles in the form of tannates.

On super-saturation of this solution with an inorganic salt, such as sodium chloride, magnesium sulphate, sodium sulphate, etc., the principles remaining in solution are completely precipitated in the form of tannates.

The tannates may then be treated with an inorganic oxide or hydroxide, such as zinc oxide, lead oxide, calcium oxide or the hydroxides of calcium, lead, iron or the like, for the liberation of the active principles from their organic precipitant, this step being the same as in the first described process. The individual cardio-active Principles I, II and III may then be separated from each other, likewise in the same manner as set forth in the preferred process.

Among the important features of my invention may be mentioned the following:

(1) The substantially complete removal of the emetic principle known as scillin.

This principle of squill has been long recognized, and much of the disagreeable quality of the unpurified drug was due to the presence of this substance. Scillin is crystalline in character, and occurs in fine needle-like water-white crystals.

(2) The use of tannic acid to precipitate the cardio-active principles, and the use of soluble inorganic salts, such as sodium chloride, magnesium sulphate, sodium sulphate and the like, to effect the substantially complete precipitation of the tannates of the cardio-active principles of squill.

When tannic acid is added to an aqueous solution of the cardio-active principles of squill, it produces only partial precipitation of the tannates thus formed. It is therefore necessary to super-saturate the solution with a soluble inorganic salt to effect the complete precipitation of these principles as tannates.

(3) The employment of zinc oxide or the like for the liberation of the cardio-active principles of squill from their tannic acid combination.

When zinc oxide is added to the moist tannate and this mixture thoroughly dried in vacuo, the zinc unites with the tannic acid, forming zinc tannate and insoluble zinc compounds with the organic impurities, thus making it possible to extract out all the cardio-active principles in a highly purified state.

(4) The employment of dilute alkaline solutions to effect solution in water of all the cardio-active principles of squill, and further, to effect the separation of Principles I and II.

When the alcoholic extract of squill is mixed with water and the oils, fats and scillin removed with petroleum ether, it will be found that there remains a considerable amount of undissolved material which contains a large proportion of the cardio-active principles. It has therefore been found desirable to employ a dilute alkaline carbonate or hydroxide solution to effect the aqueous solution of this material. Principle II is completely soluble in dilute alkaline carbonate or hydroxide solution, whereas Principle I is not, and therefore the use of these alkaline substances offers a ready means for the separation of Principle I from Principle II.

(5) The employment of petroleum ether or gasoline not only for the removal of oils, fats and scillin, but as a precipitating solvent for the cardio-active principles held in solution by the oils and fats.

When water is added to the alcoholic extract of squill the oils and fats separate as one layer, while an aqueous solution of some of the cardio-active principles occurs as another layer. If this oil is removed from the aqueous layer without further treatment, a considerable loss of active principles will occur. When petroleum ether is added to this oily layer, the oils, fats and scillin will be dissolved, while the cardio-active principles will be precipitated.

(6) The use of absolute ethyl acetate as a solvent in the preparation of the purified cardio-active principles of squill.

When ethyl acetate contains any considerable proportion of alcohol, water or ordinary impurities, such as acetic acid, it will be found that its employment in the preparation of these cardio-active principles results in a very inferior product.

(7) The distinctive method for preparing the third cardio-active principle.

By virtue of the extraction of squill with a solvent such as ethyl alcohol and the further completion of the process as outlined above, the third principle designated as III is obtained from squill, which cannot be obtained by the extraction of the drug by the employment of any immiscible solvent, with the possible exception of amyl alcohol or butyl alcohol. This principle is highly cardio-active and has physical and chemical characteristics distinct from those of either of the other principles obtained.

As far as I am aware, the existence of three cardio-active principles in squill has never before been recognized, and I believe that I am the first to separate and purify these individual principles and to determine their physical and chemical characteristics. The obtaining of the pure principles independent, one of the other, constitutes a marked advance in the art, since it is possible, when using the pure principles to accurately regulate the dosage employed when using the drug for the treatment of heart affections. For the purpose of identifying the three cardio-active principles, the following analyses are given.

Cardio-active Principle I

This substance is a pure white crystalline glucoside, showing definite composition, as determined by repeated combustion, melting point and specific optical rotation analyses.

*Solubility.*—The substance is readily soluble in chloroform, ethyl alcohol, methyl alcohol, hot benzol, acetone, ethyl acetate, amyl alcohol, propyl and butyl alcohol, etc. It is slightly soluble in ethyl ether, water and cold benzol. The substance crystallizes from hot ethyl alcohol on concentration in the form of pyramidal crystals. Crystals of various formations are obtained by crystallization from the different solvents, as before indicated, by photo-micrographs.

*Combustion analysis.*—A combustion analysis shows the presence of carbon, hydrogen and oxygen in the following proportions: C, 72.72%, H, 7.93%, O, 19.35%.

*Optical rotation.*—.5080 gm. made up to 25 cc. in 95% alcohol shows +42.6.

*Melting point.*—Principle I softens at 213° C. and melts at 220° C.

*Color reaction.*—The color is not changed by ferric chloride in alcoholic solution.

*Hydrolysis.*—Principle I readily hydrolizes with acids, producing an aglycone. C, 77.85%, H, 8.34%, O, 13.81%. The principle gives no ash on combustion.

Cardio-active Principle II

This substance is an amorphous, creamy-white powder.

*Solubility.*—The substance is soluble in ethyl and methyl alcohol, amyl, butyl and propyl alcohol, ethyl acetate, chloroform, acetone, and dilute aqueous alkaline carbonate and hydroxide solutions. It is much more readily soluble in water than Principle I. The substance is precipitated from aqueous solutions by lead subacetate and tannic acid, on super-saturation in water with soluble inorganic salts.

*Specific rotation.*—Principle II shows specific optical rotation of −36.2.

*Hydrolysis.*—Principle II hydrolizes readily in a dilute alcoholic solution with the addition of hydrochloric acid, producing a crystalline aglycone, the solution showing a marked reduction on Fehling's solution.

Cardio-active Principle III

This substance is a yellowish-white amorphous powder, readily soluble in water, ethyl and methyl alcohol, amyl and butyl alcohol, and is slightly soluble in hot acetone. The substance is insoluble in chloroform, absolute ethyl acetate, benzol, ethyl ether, and petroleum ether. This principle precipitates from aqueous solutions with lead subacetate and tannic acid, and is not precipitated from aqueous solutions by neutral lead acid. The alcoholic solution does not precipitate with lead subacetate.

*Combustion analysis.*—A combustion analysis shows the presence of carbon, hydrogen and oxygen in the following proportions: C, 57.62%, H, 7.47%, O, 34.91%.

*Optical rotation.*—Principle III shows specific optical rotation of −58.3.

*Hydrolysis.*—Principle III hydrolizes readily with hydrochloric acid in cold aqueous solution and produces a crystalline aglycone only slightly soluble in water. After hydrolysis, a marked reduction on Fehling's solution is shown.

What I claim is:

1. A process for the preparation of cardio-active principles from squill, which comprises macerating squill with an organic solvent miscible with water, filtering and evaporating the solution to dryness, dissolving the residue in water, adding an organic solvent not miscible with water and agitating to effect solution of scillin and oils and fats in the immiscible organic solvent, removing the immiscible organic solvent containing the scillin and oils and fats, adding tannic acid to the aqueous solution remaining after removal of the immiscible solvent to cause precipitation of the cardio-active principles in the form of tannates, rendering the precipitation complete by saturating the solution with a soluble inorganic salt, removing the tannates by filtration and liberating the cardio-active principles from their tannates by the addition of an inorganic oxide or hydroxide.

2. In a process of separating cardio-active principles from squill, the steps which comprise adding tannic acid to an aqueous solution containing the cardio-active principles to produce partial precipitation in the form of tannates, and adding sodium chloride to effect complete precipitation of the tannates.

3. A step in the process of producing cardio-active principles from squill, which comprises liberating the cardio-active principles from their tannates by the use of zinc oxide.

4. A process for separation of cardio-active Principles I and II from a chloroform solution containing them derived from squill which comprises adding a dilute aqueous alkaline solution which absorbs cardio-active Principle II, leaving cardio-active Principle I in the chloroform solution, separating the solutions, and recovering the cardio-active Principles I and II from their respective solutions.

5. A process for the removal of cardio-active Principle III from an aqueous solution containing it, which comprises adding tannic acid to the solution to precipitate the tannate of the cardio-active principle, completing the precipitation of the tannate by saturating the solution with an inorganic salt, removing the tannates by filtration, separating the active principle from the tannate by the addition of zinc oxide, drying the mixture in vacuo, then dissolving the cardio-active principle in ethyl alcohol, and evaporating the solvent, leaving the Principle III as a residue, in a highly purified condition.

6. As a new article of manufacture, substantially pure cardio-active Principle I derived from squill, which is a white crystalline glucoside, readily soluble in chloroform, ethyl alcohol, methyl alcohol, hot benzol, acetone, ethyl acetate, amyl, propyl and butyl alcohols, and only slightly soluble in ethyl ether, water and cold benzol, which crystallizes from hot ethyl alcohol, on concentration, into pyramidal shapes; combustion analysis substantially as follows: C 72.72%, H 7.93%, O 19.35%; melting point, 213°–220° C.; specific optical rotation +42.6, and hydrolizing readily with acids to produce an aglycone.

7. As a new article of manufacture, substantially pure cardio-active Principle II derived from squill, which is a creamy-white amorphous glucoside powder, soluble in ethyl, methyl, amyl, butyl, and propyl alcohols, ethyl acetate, chloroform, acetone, dilute aqueous alkaline carbonate and hydroxide solutions, and in water, precipitated from aqueous solution by lead subacetate, and tannic acid on super-saturation in water with soluble inorganic salts; showing specific optical rotation −36.2; and hydrolizing readily in dilute alcoholic solution with the addition of hydrochloric acid, producing a crystalline aglycone.

8. As a new article of manufacture, substantially pure cardio-active glucoside III derived from squill, which is a yellowish-white amorphous powder, readily soluble in water, ethyl, methyl, amyl and butyl alcohols; slightly soluble in hot acetone, insoluble in chloroform, absolute ethyl acetate, benzol, ethyl ether, and petroleum ether; which precipitates from aqueous solution with lead subacetate and tannic acid; is not precipitated from aqueous solution with neutral lead acetate; having a combustion analysis approximately as follows: C 57.62%, H 7.47%, O 34.91%; and showing optical rotation −58.3.

9. A process for recovering the cardio-active Principle I derived from squill from a chloroform solution containing it, produced according to claim 4, which comprises dissolving the cardio-active principle by agitating with ethyl acetate, and crystallizing the cardio-active principle by concentrating the solution.

10. A process for recovering the cardio-active Principle II derived from squill from a dilute aqueous alkaline solution containing it, produced according to claim 4, which comprises neutralizing the alkaline solution, separating the cardio-active principle from the neutralized solution by agitating with an organic solvent not miscible with water, namely ethyl acetate, and recovering the solvent in vacuo, leaving the cardio-active Principle II in a high state of purity.

11. A process for the preparation of cardio-active principles from squill which comprises percolating the drug with an organic solvent miscible with water, evaporating the solvent from the percolate, mixing the resulting extractive with water, removing the scillin, fat and oils by agitating the aqueous mixture with separate portions of an organic solvent not miscible with water, separating the organic solvent from the aqueous solution, adding tannic acid to the aqueous solution to precipitate the tannates of the cardio-active principles, further precipitating the tannates of the cardio-active principles by saturating the aqueous solution with an inorganic salt, removing the tannates by filtration and liberating the cardio-active principles from their tannates by the addition of an inorganic oxide or hydroxide.

12. A process for the preparation of cardio-active principles from squill which comprises percolating the drug with alcohol, evaporating the alcohol from the percolate, mixing the resulting extractive with water, removing the scillin, fat and oils by agitating the aqueous mixture with separate portions of an organic solvent not miscible with water, separating the organic solvent from the aqueous solution, adding tannic acid to the aqueous solution to precipitate the tannates of the cardio-active principles, further precipitating the tannates of the cardio-active principles by saturating the aqueous solution with an inorganic salt, removing the tannates by filtration and liberating the cardio-active principles from their tannates by the addition of an inorganic oxide or hydroxide.

13. A process for the preparation of cardio-active principles from squill which comprises percolating the drug with ethyl alcohol, evaporating the ethyl alcohol from the percolate, mixing the resulting extractive with water, removing the scillin, fat and oils by agitating the aqueous mixture with separate portions of an organic solvent not miscible with water, separating the organic solvent from the aqueous solution, adding tannic acid to the aqueous solution to precipitate the tannates of the cardio-active principles, further precipitating the tannates of the cardio-active principles by saturating the aqueous solution with an inorganic salt, removing the tannates by filtration and liberating the cardio-active principles from their tannates by the addition of an inorganic oxide or hydroxide.

14. A process for the preparation of cardio-active principles from squill which comprises percolating the drug with an organic solvent miscible with water, evaporating the solvent from the percolate, mixing the resulting extractive with water, removing the scillin, fat and oils by agitating the aqueous mixture with separate portions of petroleum ether, separating the petroleum ether from the aqueous solution, adding tannic acid to the aqueous solution to precipitate the tannates of the cardio-active principles, further precipitating the tannates of the cardio-active principles by saturating the aqueous solution with an inorganic salt, removing the tannates by filtration and liberating the cardio-active principles from their tannates by the addition of an inorganic oxide or hydroxide.

15. A process for the preparation of cardio-active principles from squill which comprises percolating the drug with an organic solvent miscible with water, evaporating the solvent from the percolate, mixing the resulting extractive with water, removing the scillin, fat and oils by agitating the aqueous mixture with separate portions of an organic solvent not miscible with water, separating the organic solvent from the aqueous solution, adding tannic acid to the aqueous solution to precipitate the tannates of the cardio-active principles, further precipitating the tannates of the cardio-active principles by saturating the aqueous solution with sodium chloride, removing the tannates by filtration and liberating the cardio-active principles from their tannates by the addition of an inorganic oxide or hydroxide.

16. A process for the preparation of cardio-active principles from squill which comprises percolating the drug with an organic solvent miscible with water, evaporating the solvent from the percolate, mixing the resulting extractive with water, removing the scillin, fat and oils by agitating the aqueous mixture with separate portions of an organic solvent not miscible with water, separating the organic solvent from the aqueous solution, adding tannic acid to the aqueous solution to precipitate the tannates of the cardio-active principles, further precipitating the tannates of the cardio-active principles by saturating the aqueous solution with an inorganic salt, removing the tannates by filtration and liberating the cardio-active principles from their tannates by the addition of zinc oxide.

17. A process for the preparation of cardio-active principles from squill which comprises percolating the drug with an organic solvent miscible with water, evaporating the solvent from the percolate, mixing the resulting extractive with water, removing the scillin, fat and oils by agitating the aqueous mixture with separate portions of an organic solvent not miscible with water, separating the organic solvent from the aqueous solution, adding tannic acid to the aqueous solution to precipitate the tannates of the cardio-active principles, further precipitating the tannates of the cardio-active principles by saturating the aqueous solution with an inorganic salt, removing the tannates by filtration, liberating the cardio-active principles from their tannates by the addition of an inorganic oxide or hydroxide, and subsequently separating the cardio-active principles into three groups, each having distinct physical and chemical characteristics.

18. A process for the preparation of cardio-active principles from squill which comprises percolating the drug with alcohol, evaporating the alcohol from the percolate, mixing the resulting extractive with water, removing the scillin, fat and oils by agitating the aqueous mixture with separate portions of petroleum ether, separating the petroleum ether from the aqueous solution, adding tannic acid to the aqueous solution to precipitate the tannates of the cardio-active principles, further precipitating the tannates of the cardio-active principles by saturating the aqueous solution with sodium chloride, removing the tannates by filtration and liberating the cardio-active principles from their tannates by the addition of zinc oxide.

19. A process for separating cardio-active Principles I and II from a mixture containing them derived from squill which comprises dissolving the mixture in chloroform, removing insoluble matter by filtration, adding a dilute aqueous alkaline solution to convert Principle II into an alkaline salt insoluble in chloroform, agitating the chloroform solution with separate portions of the alkaline solution to extract and remove Principle II, and separating the alkaline aqueous extractions from the chloroform solution containing Principle I.

20. In the process of separating cardio-active principles from squill as set forth in claim 11, the step which comprises removing the scillin from the aqueous solution of squill by extraction with petroleum ether.

21. A process for the separation of individual cardio-active Principles I and II from an aqueous solution containing purified cardio-active Principles I, II and III in the form of glucosides derived from squill, which comprises dissolving cardio-active Principles I and II by means of an organic solvent immiscible with water, namely ethyl acetate, which does not dissolve cardio-active Principle III, separating the immiscible organic solvent containing cardio-active Principles I and II from the aqueous solution containing cardio-active Principle III and recovering cardio-active Principle III from the aqueous solution containing it.

22. A process for the separation of individual cardio-active Principles I and II from an aqueous solution containing purified cardio-active Principles I, II and III in the form of glucosides derived from squill, which comprises dissolving cardio-active Principles I and II by means of an organic solvent immiscible with water, namely ethyl acetate, which does not dissolve cardio-active Principle III, separating the immiscible organic solvent containing cardio-active Principle III, recovering cardio-active Principles I and II from the solution containing them, and extracting cardio-active Principle III from the aqueous solution containing it.

23. A process for the separation of individual cardio-active Principles I and II from an aqueous solution containing purified cardio-active Principles I, II and III in the form of glucosides derived from squill, which comprises dissolving cardio-active Principles I and II by means of an organic solvent immiscible with water, namely ethyl acetate, which does not dissolve cardio-active Principle III, separating the immiscible organic solvent containing cardio-active Principles I and II from the aqueous solution containing cardio-active Principle III, evaporating the organic solvent containing cardio-active Principles I and II to dryness, leaving a residue comprising principally cardio-active Principles I and II, and recovering cardio-active Principle III from the aqueous solution.

CLAIR SEDGWICK DYAS.